UNITED STATES PATENT OFFICE.

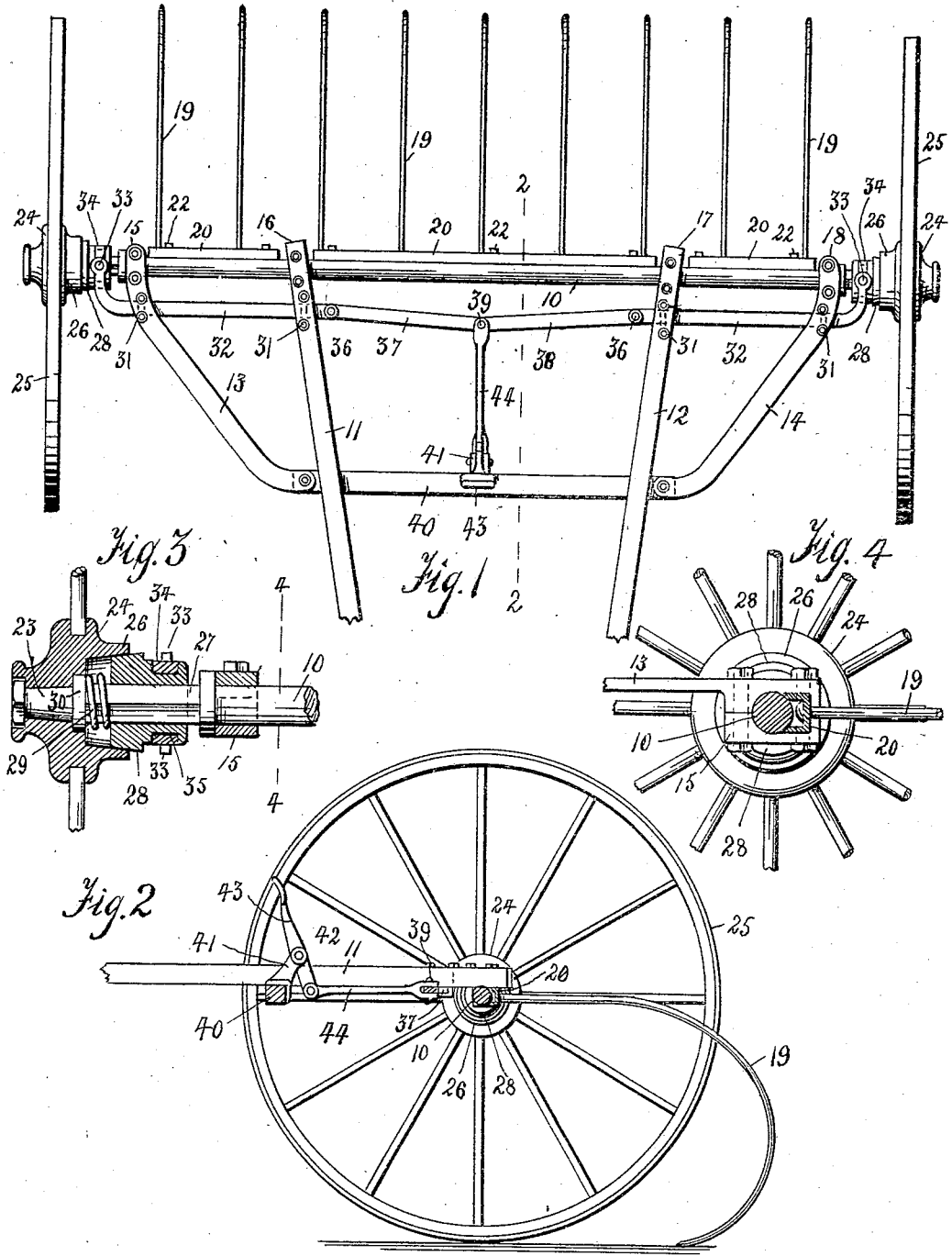

GUY G. LOWRY, OF SHERWOOD, OREGON.

SELF-DUMPING HAY-RAKE.

943,429.   Specification of Letters Patent.   Patented Dec. 14, 1909.

Application filed August 17, 1908. Serial No. 448,937.

*To all whom it may concern:*

Be it known that I, GUY G. LOWRY, a citizen of the United States, residing at Sherwood, in the county of Washington and State of Oregon, have invented certain new and useful Improvements in Self-Dumping Hay-Rakes, of which the following is a specification.

This invention relates to improvement in self dumping hay rakes, of the class of rakes wherein the motion of the ground wheels is utilized to effect the dumping of the rake when a sufficient quantity has been gathered, and has for its object to improve the construction and simplify the operation of devices of this character.

With these and other objects in view, the invention consists in certain novel features of construction, as hereinafter shown and described and specifically pointed out in the claim, and in the drawings employed for illustrating the embodiment of the invention, Figure 1 is a plan view of the improved device. Fig. 2 is a section on the line 2—2 of Fig. 1. Fig. 3 is an enlarged sectional detail of the hub of one of the ground wheels and a portion of the axle together with one of the clutch devices illustrating the construction more fully. Fig. 4 is a section on the line 4—4 of Fig. 3.

The improved device may be applied to any of the various forms of hay rakes, but for the purpose of illustration is shown applied to a conventional device of this character, and embodying an axle 10 mounted for oscillation in a supporting frame-work embracing in its construction longitudinal members 11—12 and braces 13—14, these members being connected by suitable clips 15—16—17—18 to the axle, so that the axle is free to turn in the frame-work.

Attached to the axle 10 in any suitable manner are the rake teeth 19, the means of attachment shown being sections of channel bars 20 bolted at 22 at suitable intervals to the axle, so that when the axle is turned the rake teeth will be elevated or depressed, as the case may be, in the ordinary manner.

At its outer ends the axle 10 is provided with journals, one of which is shown at 23 in Fig. 3, and carrying the hubs 24 of the ground wheels 25, the hubs having as a part of their construction clutch members 26. The portions of the axle 10 next to the ground wheels 25 are formed square, as at 27, or of other angular shape, and slidably mounted upon the portions 27 of the axle are clutch members 28 adapted to co-act with the clutch members 26, and thus couple the ground wheels to the axle, and cause the motion of the ground wheels to be imparted to the axle, as hereafter explained. Springs 29 are disposed between the sliding clutch members 28 and collars 30 upon the axle, and operating to maintain the slidable clutch members yieldingly out of engagement with the clutch members 26, so that as the device is moved forward under ordinary conditions, the ground wheels will rotate without producing any effect upon the axle.

Depending from the frame members 11—12—13—14 are guide elements 31, and slidably disposed through these guide elements are rods 32, the outer ends of the rods pivotally connected at 33 to rings 34 encircling annular channels 35 in the slidable clutch members 28, so that the movement of the rods 32 longitudinally of the axle 10 through the guide members 31 will cause the clutch members 28 to be correspondingly moved and be engaged with or disengaged from the clutch members 26.

Pivoted at 36 to the inner ends of the rods 32 are toggle links 37—38, the inner ends of the links being pivoted to each other, as shown at 39.

Connected to a cross member 40 of the frame-work is a standard 41, and pivoted at 42 to this standard is a foot lever 43, the lower end of the foot lever being connected to the pivot 39 of the links 37—38 by a connecting rod 44. By this arrangement it will be obvious that when pressure is applied by the foot of the operator to the lever 43 the connecting rod 44 will move the links 37—38 toward the axle, and thus move the rods 32—32 outwardly in opposite directions, and through their connection to the slidable clutch members 28, the latter will be coupled to the clutch members 26 and thus transmit the rotary motion of the wheels 25—25 to the axle and cause the latter to oscillate forwardly and forcibly move the rake teeth 19 upwardly and thus dump the load, the extent of the lifting movement being controllable by the operator, as will be obvious.

The device will be supplied with the usual driver's seat and other appliances usually connected to devices of this character, but as these parts form no part of the present invention, they are not illustrated. By this simple arrangement it will be obvious that the "load" may be dumped at any time required, and without further exertion on the part of the operator than is required to apply a slight pressure upon the lever 43 with the foot, and to release the axle and permit the rake teeth to return to their former position by gravity when the load has been dumped.

One of the important features of this structure is the friction clutch mechanism employed in connection with the means for applying such clutch mechanism to the wheels in order to secure the same to the axle. It will be observed that with the operating means, as the clutches are applied to the wheels, the power of the application is gradually increased, inasmuch as the toggle links are brought into alinement with each other and with the reciprocating rods. This is highly advantageous, inasmuch as it gradually produces a clutching action between the wheels and the axle and avoids the shocks and jar, which would result from an instantaneous connection between the two relatively moving parts. At the same time, when the clutch devices are finally engaged with the wheels, a powerful clutching action is secured that insures the turning of the rake.

The device is simple in construction, can be inexpensively manufactured and of any suitable material, and applied by slight and unimportant modifications to any of the various forms of hay rakes manufactured.

Having thus described the invention, what is claimed as new is:—

In a wheel rake, the combination with a supporting frame including spaced longitudinal members, a cross bar connecting the members and rearwardly extending divergent braces secured to the cross bar, of bearing boxes connected to the rear ends of the longitudinal members and the braces, an axle journaled in the bearing boxes, rake teeth carried by the axle, wheels loosely journaled on the ends of the axle, friction clutch elements slidably mounted on the axles between the braces and wheels and movable into and out of engagement with said wheels, boxes secured to the braces and longitudinal members in advance of the axle, alined reciprocatory rods slidably mounted in the latter boxes and having their outer ends connected directly to the clutch elements, and toggle links pivotally connected to the inner ends of the rods and to each other, a lever fulcrumed between its ends on the cross bar, said lever having a treadle on its upper end, and a link connected to the lower end of the lever and to the toggle links.

In testimony whereof I affix my signature, in presence of two witnesses.

GUY G. LOWRY.

Witnesses:
A. B. HOPE,
M. E. BUCK.